United States Patent [19]

Brandt, Jr.

[11] Patent Number: 4,928,529
[45] Date of Patent: May 29, 1990

[54] FORCE MULTIPLYING MEMBRANE INSTRUMENT

[76] Inventor: Robert O. Brandt, Jr., 5404 Pond Dr., Wilmington, N.C. 28403

[21] Appl. No.: 266,822

[22] Filed: Nov. 3, 1988

Related U.S. Application Data

[63] Continuation-in-part of Ser. No. 128,777, Dec. 4, 1987, abandoned.

[51] Int. Cl.⁵ .......................... G01L 7/08; G01L 9/04
[52] U.S. Cl. .......................................... 73/726; 73/720
[58] Field of Search ................ 73/715, 726, 727, 720, 73/721, 725, 719, 723, 716, 717

[56] References Cited

U.S. PATENT DOCUMENTS

| | | | |
|---|---|---|---|
| 2,656,735 | 10/1953 | Guillemin, Jr. | 73/726 |
| 2,981,912 | 4/1961 | Giovanni | 338/4 |
| 3,026,909 | 3/1962 | Boteler | 137/793 |
| 3,262,317 | 7/1966 | Smith, Jr. | 73/716 |
| 3,791,216 | 2/1974 | Blanchard | 73/517 B |
| 3,818,765 | 6/1974 | Eriksen | 128/205 E |
| 3,894,435 | 7/1975 | Shimada et al. | 73/115 |
| 4,203,327 | 5/1980 | Singh | 73/721 |
| 4,220,836 | 9/1980 | Hersey | 92/103 M |
| 4,322,979 | 4/1982 | Fromm | 73/705 |
| 4,577,510 | 3/1986 | Bur et al. | 73/708 |
| 4,637,987 | 1/1987 | Minten et al. | 436/151 |
| 4,686,764 | 8/1987 | Adams et al. | 73/706 |
| 4,691,573 | 9/1987 | Varnum et al. | 73/702 |
| 4,703,658 | 11/1987 | Mrozack, Jr. et al. | 73/724 |
| 4,732,042 | 3/1988 | Adams | 73/706 |

Primary Examiner—Donald O. Woodiel

[57] ABSTRACT

The present invention entails a force multiplying instrument that functions to multiply an input force, such as input pressure signal. A substantially constant area membrane is preshaped to assume a concave-convex shape and is disposed within a housing structure where it extends across an open chamber within the housing structure and is secured about its periphery by the side walls of the housing structure. For positive multiplication, a force sensing system is disposed on the concave side of the membrane and actually extends into engagement with the membrane for supporting the same about the concave side. Because the membrane is preshaped, it extends inwardly at a selected angle relative to the horizontal plan of the periphery of the membrane secured within the housing. The force applied to the convex side of the membrane and transferred against the force sensing system is multiplied because of the angle of the membrane and the position of the force sensing system. In an alternate embodiment a flat membrane is used.

16 Claims, 4 Drawing Sheets

FORCE MULTIPLYING MEMBRANE INSTRUMENT

This application is a continuation-in-part of U.S. patent application Ser. No. 128,777 filed Dec. 4, 1987, now abandoned.

FIELD OF THE INVENTION

The present invention relates to instrumentation and more particularly to a force multiplier that functions to receive an input force in the form of a fluid pressure and to produce an output force that is a multiple of the input force.

BACKGROUND OF THE INVENTION

Force multipliers or pressure transmitters that produce an electrical output are commercially available. However, they are not without their drawbacks or shortcomings. First, they are typically relatively expensive and are not usually capable of responding with great sensitivity and accuracy, especially with respect to low pressures. Put simply, there are not many force multipliers or pressure transmitters commercially available today that are relatively inexpensive and which have the capacity to measure full scale on the order of 0.010 inch of water column. To even approach this range of sensitivity with any reasonable degree of accuracy results in the instrument being both relatively large and expensive. This is because force multipliers and pressure transmitters of the past that are capable of producing an electrical output have been designed around diaphragms, fulcrums, and levers. Besides the obvious disadvantages associated with size, this design approach gives rise to other problems as well.

With a conventional fulcrum and lever design, one has moving points, friction, and slop in the connecting linkage. All of this gives rise to hysteresis problems which contribute greatly to inaccuracies of the force multiplier.

Added to this is the basic problem that comes about due to the diaphragm itself being the measuring element. For very small movements of the diaphragm, there is obviously an output. Yet, the very small movements of the diaphragm may be design related or internally generated, and not in any way be a result of a force or pressure change acting on the diaphragm of the instrument. The obvious result of this is a most inaccurate instrument that cannot be relied upon and which has very poor repeatability.

OBJECT OF THE INVENTION

The present invention entails a force multiplying instrument designed to yield an electrical output that is quite sensitive to low force and pressure levels but yet which is highly accurate and relatively inexpensive. Instead of a design built around a conventional diaphragm, fulcrums, and levers, the force multiplying instrument of the present invention is designed around a force balancing membrane concept wherein the membrane is particularly preshaped and disposed such that an input force applied to the input side of the membrane is transferred to a force sensing system disposed on the opposite side of the membrane in such a fashion that the input force is effectively multiplied in the process.

In particular, the membrane is preshaped to assume a concave-convex shape and is particularly angularly disposed with respect to the supporting force sensing system such that the balancing or supporting force is a multiple of the particular input force.

It is therefore an object of the present invention to provide a force multiplier with an electrical output, the device being relatively small and inexpensive but which is highly sensitive and accurate.

Another object of the present invention resides in the provision of a force multiplier instrument of the character referred to above that overcomes the inherent disadvantages associated with like instruments that are of a diaphragm, fulcrum, and lever design.

Another object of the present invention resides in the provision of a force multiplying instrument that utilizes a force balancing concept wherein the force balancing occurs across a genuine membrane that is substantially nonelastic and which will not withstand a significant bending moment.

A further object of the present invention resides in the provision of a force multiplying instrument of the character referred to above that includes a preshaped concave-convex membrane that is supported on one side about its center by a force sensing system that is responsive to an input force being applied to the opposite side of the membrane to produce an electrical output signal that is a multiple of the input force.

Still a further object of the present invention resides in the provision of preshaping a membrane and orienting the same within a housing structure such that the membrane normally lies at angle with respect to its secured perimeter and wherein the angle of the membrane with respect to its secured perimeter results in the opposing balancing force being a multiple of the applied force.

It is also an object of the present invention to provide a force multiplying instrument of the character referred to above that can be easily and conveniently designed and adjusted to accommodate various ranges of input forces or pressure.

It is also an object of the present invention to provide a force multiplying instrument of the character referred to above that can be efficiently and effectively used in a wide range of differential force or pressure applications.

Other objects and advantages of the present invention will become apparent and obvious from a study of the following description and the accompanying drawings which are merely illustrative of such invention.

DETAILED DESCRIPTION OF THE ILLUSTRATED EMBODIMENTS

Figure 1:
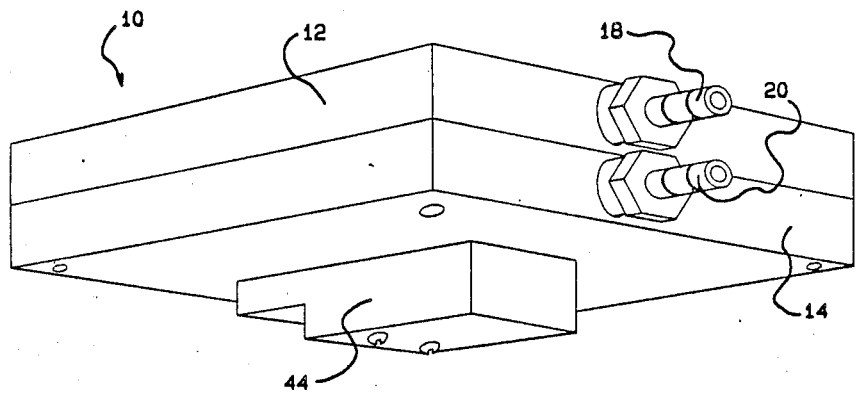
FIG. 1 is a perspective view of the force multiplying instrument of the present invention.

With further reference to the drawings, the force multiplying instrument of the present invention is shown therein and indicated generally by the numeral 10.

Force multiplying instrument 10 includes a housing structure that is made up by upper and lower half sections 12 and 14 that are designed to be secured together to form an internal chamber indicated by the reference numeral 16.

Formed in upper section 12 is a high input opening 18. Formed within lower half section 14 is a low input opening 20. The significance of openings 18 and 20 will be more fully understood and appreciated after considering subsequent portions of this disclosure.

Force multiplying instrument 10 is provided with a force sensing system 22 indicated generally by 22 that is secured within an open area formed in the lower half section 14. Force sensing system 22 includes a weigh beam 24 that is secured to lower half section 14 through a beam mounting block 26. An attaching screw 28 extends through beam mounting block 26 and with the assistance of a washer 28a secures beam mounting block 26 and beam 24 to the housing structure of the force multiplying instrument 10.

Secured to the opposite end of weigh beam 24 is a mounting bracket 30. Mounting bracket 30 is secured to weigh beam 24 via a screw 32 and associated washer 32a.

A rod 34 is adjustably mounted within bracket 30 by set screw 36. Rod 34 extends upwardly through chamber 16 and includes a support disk 38 mounted about the upper terminal end.

Figure 2:
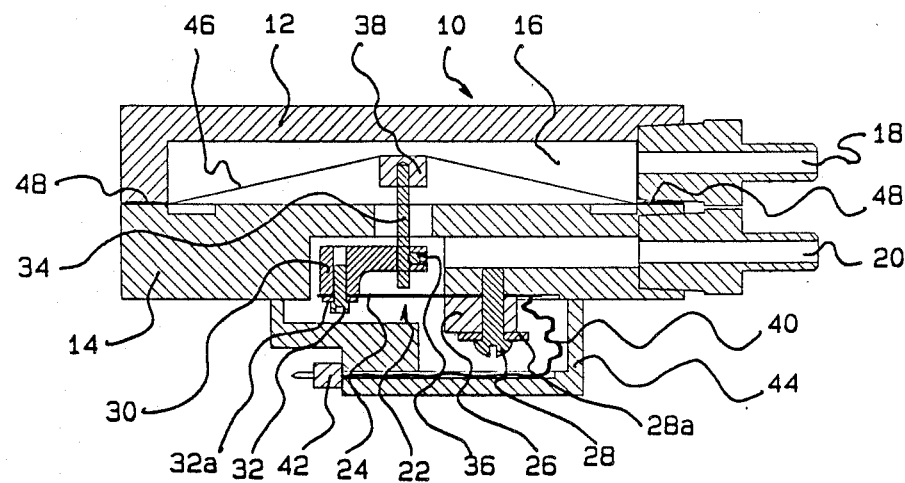
FIG. 2 is a transverse sectional view of the force multiplying instrument of the present invention.

As seen in FIG. 2, because of the design of the lower half of section 14 and the placement of the force sensing system 22 therein, the force multiplier 10 is generally open about the exterior of the lower half section 14. To close the force multiplier 10, there is provided an electrical cover and gas seal indicated by the numeral 44. A connecting wire 40 is secured to weigh beam 24 and extends therefrom through an opening within electrical cover 44 to where the connecting wire 40 connects with an electrical connector 42.

Disposed within chamber 16 is a relatively thin membrane 46. The membrane is a genuine membrane inasmuch as it is substantially non-elastic and will not withstand a significant bending moment. Expressed in other ways, membrane 46 is constructed of material having a very high stress to deformation ratio (modulus of elasticity). An example of material constituting a membrane would be that produced by Dupont under the name Mylar.

Membrane 46 includes an outer perimeter that is secured in sandwich fashion between the upper and lower half sections 12 and 14, again as illustrated in FIG. 2. Note that along the securing area, there is provided a gasket 48 that seals internal chamber 16. Also, it is appreciated that the force multiplier 10 and its housing structure would include means, such as screws, that would extend through the upper and lower half sections 12 and 14 so as to secure the respective half sections firmly together and accordingly anchor the perimeter of the membrane 46 about the surrounding side wall structure of the housing.

Membrane 46 is preshaped to assume a generally concave-convex shape. The preshaping is accomplished through conventional heating means while the membrane is held within a concave-convex form.

As oriented within the drawing, as illustrated in FIG. 2, it is seen that the membrane 46 extends inwardly from the side walls of the instrument housing structure at an angle to the plane of the membrane secured perimeter. This is due in part at least to the preshaping of the membrane 46. Note that the membrane 46 extends generally upwardly and inwardly as viewed in FIG. 2 and extends over disk 38 that supports the membrane 46 centrally and forms a part of the force sensing system 22. Thus, membrane 46 assumes a convex shape about the input side of the membrane, the input side being that side communicatively connected to the input opening 18. The concave side of the membrane 46 faces the force measuring system 22 and lies adjacent the low force or low pressure area that is communicatively open to the low input 20.

The weigh beam 24 is a conventional transducer and is typically referred to as a planar beam sensor. Such beams are designed to measure force, pressure, displacement, etc. Generally, such planar beam sensors include an integrated strain gauge that is laminated to the beam. As the beam 24 is loaded, it along with its integrated strain guage provides an electrical output that is representative of the load sensed by the beam. Details of the beam type transducer 24 are not dealt with herein in detail because such is not per se material to the present invention and because such beams are commercially available.

Figure 3:
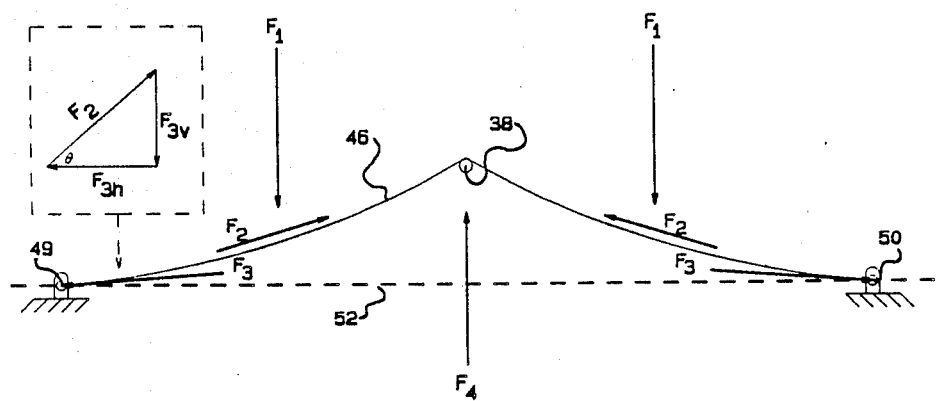
FIG. 3 is a schematic view that illustrates the design principles employed by the present invention in achieving force multiplication through the preshaped membrane.

Now turning to FIG. 3 and to the schematic illustration therein, it is seen that membrane 46 is supported about opposite reference pin points 49 and 50. This is intended to simulate the securing of the membrane within the housing. Note also, membrane 46 is supported about its center by disk 38. Due to the preshaping of the membrane 46 to assume the convex-concave shape, it is appreciated that the membrane 46 forms an angle with a horizontal reference plane indicated by numeral 52 in FIG. 3. Horizontal reference plane 52 extends through the secured perimeter of membrane 46. Consequently, it is appreciated that there is formed an acute angle $\theta$ between the membrane 46 and horizontal reference plane 52.

In operation, the convex side of membrane 46 is loaded with an input force of pressure represented by vectors $F_1$. This results in the membrane 46 being placed in tension between disk 38 and its outer secured perimeter or reference points 49 and 50. Because of this tension there will be a tension force $F_2$ existing in the membrane. The $F_2$ tensioning force is opposed by a force $F_3$ at the secured perimeter reference points, 48 and 50. Opposing force $F_3$ can be broken down into its horizontal component vector $F_{3h}$ and its vertical component vector $F_{3v}$. It is appreciated that as angle $\theta$ is increased, the horizontal component force $F_{3h}$ decreases while the vertical component $F_{3v}$ increases. As angle $\theta$ increases, the vertical force acting on disk 38 and the associated force sensing system 22 increases. (The vertical force exerted by disk 38 is represented by the vector $F_4$.) $F_1$ and $F_4$ are equal and opposing forces. The mechanical force amplification is derived entirely from the vertical component of vector $F_3$. Consequently, by increasing the angle at which membrane 46 extends with respect to the horizontal reference plane 52 the balancing force applied through disk 38 is amplified. This gives rise to the force amplification system of the present invention. Thus, for a given range of input pressures or forces, one can determine an angle $\theta$ for the membrane and, consequently, can achieve force or pressure amplification through the membrane.

Therefore, it is appreciated that for any force or any pressure differential that exists across membrane 46 that the pressure or force differential will be multiplied by the membrane acting through the pressure sensing system 22. This multipliciation is achieved by particularly shaping the membrane to form a convex-concave shape and particularly orienting the membrane with respect to the disk 38 to the weigh beam 24. Weigh beam 24 yields an electrical output that is representative of the applied input force or pressure as multiplied.

It is appreciated that the angle θ can be varied to give a range of multiplications for any given application. It is also appreciated that the multiplication can even be made negative by allowing the membrane to be disposed at a negative angle. Stated in another way, this negative multiplication can be achieved by preshaping and disposing membrane 46 such that is extends underneath the horizontal reference plane 52, as viewed in FIG. 3. In such a case the input pressure would then be applied against the concave side of the membrane 46 and the pressure sensing system would engage and support the membrane adjacent its convex side.

Figure 4:
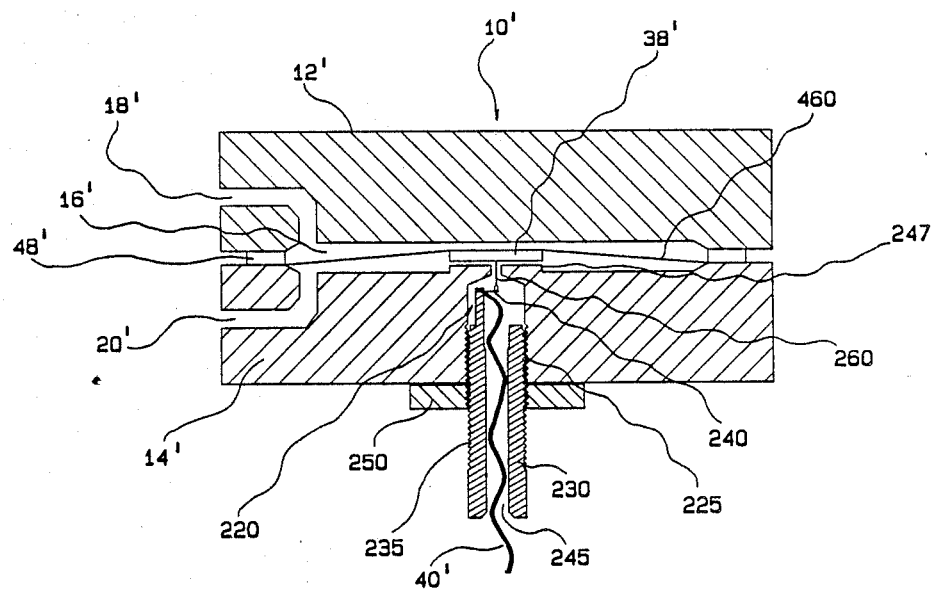
FIG. 4 is a transverse sectional view of a second embodiment of the force multiplying instrument of the present invention.

The embodiment illustrated in FIG. 4 is similar in many respects to that previously illustrated and described in detail. To avoid repetition, elements of this embodiment which correspond to those previously described will be identified by corresponding reference numbers, with prime notation (') added. Basically, this embodiment differs over the previous embodiment in that a different membrane and force sensing system is employed.

In the embodiment illustrated in FIG. 4, the force multiplying instrument 10' includes a housing structure that comprises upper and lower half sections 12',14' that are designed to form an internal chamber 16'. Formed in the upper section 12' is a high input opening 18' and formed within the lower half section 14' is a low input opening 20'.

The force multiplying instrument 10' is also provided with a force sensing system generally indicated at 220 that is secured within an open area formed in the lower half section 14'. The lower half section 14' includes a threaded opening 225 that is adapted to receive an adjustably positionable support shaft 230 having exterior threads 235 and including a bore extending along its length and defining a wire conduit 245. A jamnut 250 is provided to maintain the support shaft 230 in its desired position as will be more fully described hereinafter. The lower half section 14' also includes a centrally positioned seat means 247 which takes the form of an elevated section of the lower half section 14'.

Force sensing system 220 includes a miniature weigh beam 240 such as a silicon cantilever beam or silicon strain gauge. The weigh beam 240 is secured by adhesive such as epoxy TM or other suitable means to the uppoer end of the support shaft 230.

A link in the form of a cylindrical rod has one of its ends secured to the cantilever end of beam 240. The rod 260 extends upwardly through chamber 16' and mounts a support disk 38' at its upper end. Both of the aforementioned connections are made with Epoxy TM or other suitable means.

As seen in FIG. 4, because of the design of the lower half section 14' and the placement of the force sensing system 220 therein the force multiplier 10' is generally open about the exterior of the lower half of section 14'. To close the force multiplier 10', an optional electrical cover and gas seal may be provided (not shown). A connecting wire 40' is secured to weigh beam 240 and extends therefrom through the bore within support shaft 230 where the connecting wire 40' may be connected to an electrical connector, also not shown.

Disposed within chamber 16 is a relatively thin substantially constant area membrane 460. The membrane is substantially similar to that previously discussed and includes an outer perimeter that is secured in sandwich fashion between the upper and lower half sections 12' and 14'. Note that along the securing area, there is provided a gasket 48' that seals the internal chamber 16'. Also, it is appreciated that the force multiplier 10' and its housing structure include means, such as screws, that extend through the upper and lower half sections 12',14' so as to secure the respective half section firmly together and accordingly anchor the perimeter of the membrane 460 about the surrounding wall structure of the housing.

In this embodiment membrane 460 differs from that which was previously described in that it is not preshaped. As oriented within the drawing, and as illustrated in FIG. 4, it is seen that membrane 460 extends inwardly from the side walls of the instrument housing structure at a slight angle to the plane of the membrane secured perimeter. This is due to deformation provided as result of the upward pressure of support disk 38' on the membrane 460. The deformation in the specific embodiment is shown in FIG. 4 is exaggerated for the purpose of illustration with the rise off the vertical being approximately 0.005 inches for a sum of 0.6 inches and the theroretical rise limit using the flat membrane would be the amount required to cause excessive distortion of the membrane. It will be noted that an increase in the vertical rise results in a similar increase in the force multiplier. Note that the membrane 460 extends generally upwardly and inwardly as viewed in FIG. 4 and extends over disk 38' that supports the membrane 460 centrally and forms a part of the force sensing system 220. Thus, membrane 460 assumes a convex shape about the high input side of the membrane, the input side being communicatively connected to the high input opening 18'. The concave side of the membrane 460 faces the force measuring system 22 and lies adjacent the low force or pressure area that is communicatively open to the low input 20'.

The seat means 247 is positioned on the concave side of the membrane proximate the medial portion thereof and serves to limit the movement of the membrane in the event an abnormally large force is applied to the high input side of the membrane.

The operation of the above described embodiment is essentially identical to the previously described transducer and, therefore, will not be repeated again.

From the foregoing description, it is appreciated that the present force multiplying instrument has many advantages over force multipliers and pressure transmitters of the prior art. Principal among these advantages is that the present force multiplier can be of a relatively small size but yet relatively inexpensive. Its design will enable relatively low pressures and forces to be measured with great accuracy and without the common problems of hysteresis and poor repeatability that have commonly plagued diaphragm force multipliers and pressure transmitters.

The present invention may, of course, be carried out in other specific ways than those herein set forth without parting from the spirit and essential characteristics of the invention. The present embodiments are, therefore to be considered in all respects as illustrative and not restrictive, and all changes coming within the meaning and equivalency range of the appended Claims are intended to be embraced therein.

That which is claimed is:

1. A force multiplying membrane instrument comprising:
   a housing structure having an open internal chamber;
   a substantially constant area membrane spanning the open chamber and secured about its perimeter by the housing structure such that it includes concave and convex opposite sides as disposed in the open chamber;
   a force sensor disposed on the concave side of the membrane, said force sensor comprising a beam secured about one end to the housing and extending in cantilever fashion therefrom;
   means interposed between the force sensor and the membrane for transferring a force applied to the membrane to the force sensor comprising a bracket secured to the end of the beam opposite the end attached to the housing, a rod secured to the bracket and extending upwardly therefrom and an engager attached to the rod for engaging and supporting the membrane about a central portion thereof;
   and wherein the convex side of the membrane forms an input side for receiving an input force that is effectively multiplied by the membrane due to its convex orientation and its physical characteristics, and wherein the multiplied force generated by the membrane is transferred to the force sensor that produces an output which represents the input force as multiplied by the membrane.

2. The force multiplying membrane instrument of claim 1 wherein the means for transferring the force to the force sensor includes a central membrane engager that normally engages a central area of the membrane on the concave side thereof, and a linkage interconnected between the membrane engager and the force sensor such that as force is applied to the input side of the membrane, the membrane actually acts against the membrane engager which in turn transfers the force generated by the membrane to the force sensor.

3. The force multiplying membrane instrument of claim 1 wherein the membrane includes a perimeter portion;
   and wherein the housing structure includes first and second mating sections that are designed to be secured together so as to define the open internal chamber therebetween;
   and wherein the perimeter of the membrane is secured between the mating sections such that the membrance spans the open chamber.

4. The force multiplying membrane instrument of claim 1 wherein in a no-load position the concave-convex shape of said membrane is obtained by support supplied by the force transferring means that transfers the force generated by the membrane to the force sensor.

5. The force multiplying membrane instrument of claim 1 wherein the means interposed between the force sensor and the membrane for centrally supporting the membrane projects upward where the same engages the membrane in such a fashion that the membrane actually lies over the same while the membrane is supported about its perimeter by the housing structure.

6. The force multiplying membrane instrument of claim 1 wherein the membrane assumes a convex-concave shape within the internal chamber and wherein the central portion of the membrane is supported by the means interposed between the force sensor and the membrane for transferring forces applied to the membrane to the force sensor;
   and wherein the convex-concave shape of the membrane within the internal chamber of the housing gives rise to the multiplication of forces applied to the convex side of the membrane due to the orientation of the membrane with respect to the means supporting the central portion thereof.

7. An apparatus according to claim 1 further including a seat means positioned on the concave side of said membrane proximate the medial portion thereof for limiting the movement of said membrane, whereby the force sensor is protected in the event an abnormally large input force is applied on the input side of the membrane.

8. An apparatus according to claim 7 wherein said membrane is preshaped so as to include a concave side and a convex side.

9. A force multiplying membrane instrument comprising:
   a housing structure having an open internal chamber;
   a substantially constant area membrane spanning the open chamber and secured about its perimeter by the housing structure such that it includes concave and convex opposite sides as disposed in the open chamber;
   a force sensor disposed on the concave side of the membrane comprising a beam secured about one end to the housing and extending in cantilever fashion therefrom;
   means interposed between the force sensor and the membrane for transferring a force applied to the membrane to the force sensor comprising a rod having one end secured to the end of the beam opposite the end attached to the housing and extending upwardly therefrom and an engager attached to the opposite end of said rod for engaging and supporting the membrane about a central portion thereof; and
   wherein the convex side of the membrane forms an input side for receiving an input force that is effectively multiplied by the membrane due to its convex orientation and its physical characteristics, and wherein the multiplied force generated by the membrane is transferred to the force sensor that produces an output which represents the input force as multiplied by the membrane.

10. The force multiplying membrane instrument of claim 9 wherein the means for transferring the force to the force sensor includes a central membrane engager that normally engages a central area of the membrane on the concave side thereof, and a linkage interconnected between the membrane engager and the force sensor such that as force is applied to the input side of the membrane, the membrane actually acts against the membrane engager which in turn transfers the force generated by the membrane to the force sensor.

11. The force multiplying membrane instrument of claim 9 wherein the membrane includes a perimeter portion;
    and wherein the housing structure includes first and second mating sections that are designed to be secured together so as to define the open internal chamber therebetween;
    and wherein the perimeter of the membrane is secured between the mating sections such that the membrane spans the open chamber.

12. The force multiplying membrane instrument of claim 9 wherein in a no-load position the concave-convex shape of said membrane is obtained by support supplied by the force transferring means that transfers the force generated by the membrane to the force sensor.

13. The force multiplying membrane instrument of claim 9 wherein the means interposed between the force sensor and the membrane for centrally supporting the membrane projects upward where the same engages the membrane in such a fashion that the membrane actually lies over the same while the membrane is supported about its perimeter by the housing structure.

14. The force multiplying membrane instrument of claim 9 wherein the membrane assumes a convex-concave shape within the internal chamber and wherein the central portion of the membrane is supported by the means interposed between the force sensor and the membrane for transferring forces applied to the membrane to the force sensor.

15. An apparatus according to claim 9 further including a seat means positioned on the concave side of said membrane proximate the medial portion thereof for limiting the movement of said membrane, whereby the force sensor is protected in the event an abnormally large input force is applied on the input side of the membrane.

16. An apparatus according to claim 15 wherein said membrane is preshaped so as to include a concave side and a convex side.

\* \* \* \* \*